(No Model.)
C. KEYWORTH.
Carving Implement.
No. 232,645. Patented Sept. 28, 1880.
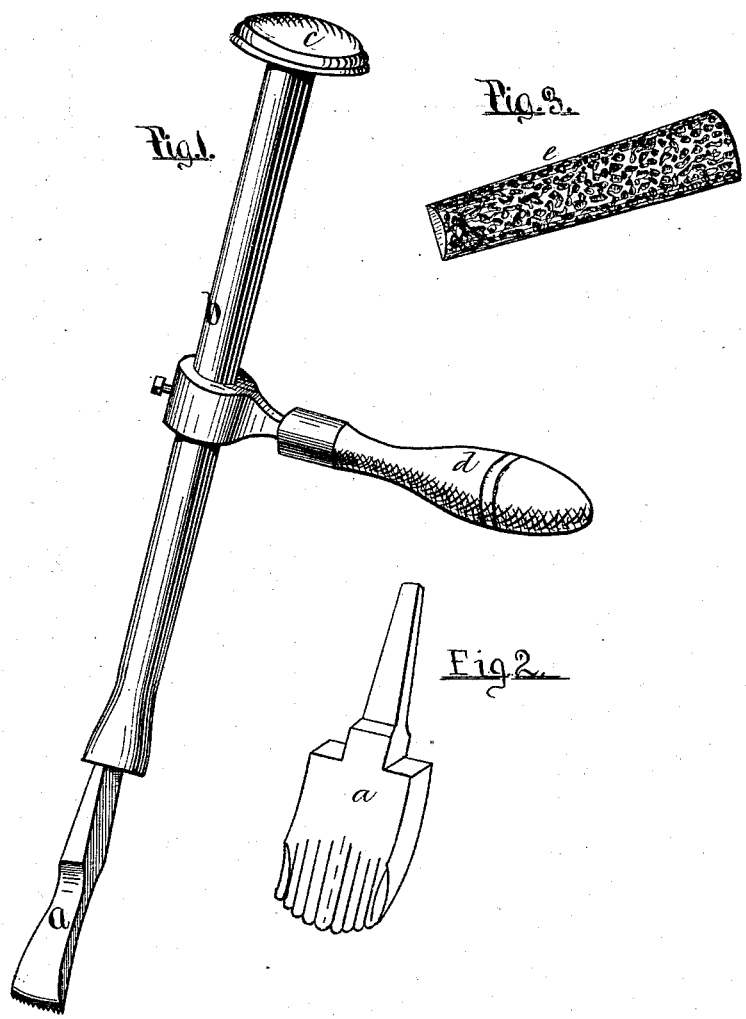

UNITED STATES PATENT OFFICE.

CHARLES KEYWORTH, OF SALISBURY, CONNECTICUT.

CARVING IMPLEMENT.

SPECIFICATION forming part of Letters Patent No. 232,645, dated September 28, 1880.

Application filed May 20, 1880. (No model.)

*To all whom it may concern:*

Be it known that I, CHARLES KEYWORTH, of Salisbury, in the county of Litchfield and State of Connecticut, have invented an Improved Implement for Carving Bone and Like Substances, of which the following is a description, reference being had to the accompanying drawings, where—

Figure 1 is a perspective view of my improved implement for carving bone, &c. Fig. 2 is a perspective view of the opposite side of the tool or chisel enlarged and provided with curved teeth. Fig. 3 is a view of the finished product.

The object and purpose of the invention are the carving of the surface of bone for knife-handles, "scales," and the like, in close imitation of the surface of stag-horn.

My improved implement consists in a tool or chisel, $a$, having a number of cutting-points arranged side by side, a stock or shaft, $b$, into which the tang of the tool is fitted, and a lever or handle, $d$, for grasping and controlling the movements of the implement as the tool is advanced along the surface of the material to be carved while the necessary blow or pressure is being applied to the head $c$ of the stock. The implement is taken up by the lever or handle $d$, and so placed that the tool will be inclined to the rounded surface of the knife-scale to be operated on and a rolling or reciprocating motion given the tool, the cutting-points of which are caused to penetrate and raise the surface to be decorated by the blow or pressure exerted on the head $c$ of the stock $b$. The tool should be rolled about one-quarter of a circle each way, back and forth, said motion being kept up during the progress of the tool till the end of the scale is reached, the tool traveling with this rolling motion three or four times down each scale. The result of the use of this implement upon the surface of horn, bone, or the like is the cutting, carving, and pitting of the surface in exact imitation of the surface of natural stag-horn.

The implement shown in the drawings is designed for hand use. It is, however, obvious that the construction of the implement—*i. e.*, a tool or chisel with a number of laterally-arranged cutting-points and provided with a lever or other means for giving the tool a rolling motion—admits of its being readily operated by any other power than by hand.

The product $e$, Fig. 3, is a piece of bone first given a desired shape, then operated upon by this implement, and afterward dyed to color of stag-horn.

I claim as my invention—

An implement for carving bone, horn, &c., consisting of a tool or chisel, $a$, having a series of laterally-arranged cutting-points, a stock or shaft, $b$, to which said tool or chisel is attached, and a lever or handle, $d$, for imparting a rolling motion thereto, substantially as described.

CHARLES KEYWORTH.

Witnesses:
 DONALD T. WARNER,
 F. A. JEWELL.